US011924936B2

United States Patent
(12) United States Patent
Ormsbee et al.

(10) Patent No.: US 11,924,936 B2
(45) Date of Patent: Mar. 5, 2024

(54) SYSTEMS AND METHODS FOR OPTIMIZED SINGLE BUTTON CONTROL OF A LIGHTING MODULE INCLUDING PRESET MEMORY AND HOLD CONTROL

(71) Applicant: Nite Ize, Inc., Boulder, CO (US)

(72) Inventors: Bowden Ormsbee, Longmont, CO (US); Steven L. Lindquist, Broomfield, CO (US)

(73) Assignee: Nite Ize, Inc., Boulder, CO (US)

( * ) Notice: Subject to any disclaimer, the term of this patent is extended or adjusted under 35 U.S.C. 154(b) by 136 days.

(21) Appl. No.: 17/217,378

(22) Filed: Mar. 30, 2021

(65) Prior Publication Data

US 2022/0322507 A1 Oct. 6, 2022

(51) Int. Cl.
*H05B 45/20* (2020.01)

(52) U.S. Cl.
CPC .................................... *H05B 45/20* (2020.01)

(58) Field of Classification Search
None
See application file for complete search history.

(56) References Cited

U.S. PATENT DOCUMENTS 6,942,357 B2 9/2005 Parsons et al.
7,683,275 B2 3/2010 Moore et al.
7,726,852 B2 6/2010 Sanoner et al.
8,534,885 B2 9/2013 Moore et al.
8,550,653 B2 10/2013 Wilson et al.
8,806,723 B2 8/2014 Martinson et al.
10,215,383 B2 2/2019 Grider et al.
2002/0047646 A1* 4/2002 Lys .......................... F21S 4/28 315/312
2003/0214259 A9* 11/2003 Dowling .................. F21K 9/23 315/312
2004/0201983 A1 10/2004 Yu
2006/0176685 A1 8/2006 Galli et al.
2007/0293125 A1* 12/2007 Jenkins .................. A63H 29/22 446/454
2014/0203710 A1* 7/2014 Li .......................... H05B 47/10 315/129
2014/0265906 A1 9/2014 Lim et al.
(Continued)

OTHER PUBLICATIONS

International Search Report and written Opinion dated Jun. 16, 2022 issued in related PCT App. No. PCT/US2022/071410 (8 pages).
(Continued)

*Primary Examiner* — Crystal L Hammond
(74) *Attorney, Agent, or Firm* — Haynes and Boone, LLP

(57) ABSTRACT

A method for selecting a mode/color on a lighting module, the lighting module having only a single button includes: receiving a first actuation of the single button at the lighting module. The method further includes responsive to the first actuation, turning the device on and displaying a first mode/color. The method further includes detecting that the single button is held down. The method further includes displaying a plurality of modes/colors in a timed sequence, such that each mode/color of the plurality of modes/colors is displayed for a preset period of time. The method further includes detecting that the single button is released. The method further includes displaying a selected mode/color of the plurality of modes/colors that was displayed when the single button was released.

19 Claims, 2 Drawing Sheets

(56) References Cited

U.S. PATENT DOCUMENTS

| | | | | |
|---|---|---|---|---|
| 2017/0034896 | A1* | 2/2017 | Minsky | H05B 47/185 |
| 2017/0041999 | A1* | 2/2017 | Moore | H05B 47/105 |
| 2017/0184260 | A1 | 6/2017 | Munoz | |
| 2017/0276303 | A1 | 9/2017 | Chen | |
| 2020/0032969 | A1* | 1/2020 | Chen | F21V 23/0428 |
| 2020/0124241 | A1 | 4/2020 | Inskeep | |

OTHER PUBLICATIONS

International Search Report and Written Opinion dated Apr. 15, 2022 issued in related PCT App. No. PCT/US2022/071407 (8 pages).

* cited by examiner

SYSTEMS AND METHODS FOR OPTIMIZED SINGLE BUTTON CONTROL OF A LIGHTING MODULE INCLUDING PRESET MEMORY AND HOLD CONTROL

BACKGROUND

In various scenarios, lighting devices for consumers are created with an emphasis on simplicity and durability. In some scenarios, such lighting devices may include only a single button for control. Even though the device only includes a single button, it may be desirable to have multiple modes of function, including multiple colors and flashing sequences.

The compact size and high intensity lighting capability of LEDs makes the creation of small lighting devices readily possible. In many scenarios, these devices only include a single switch, since this assists in creating an economy of size and fabrication. Additionally, lighting modules with single button control can be implemented in a wide variety of devices, including but not limited to balls, light-sticks, glowsticks, flying discs, headbands, bicycle lights, goal markers, fan appreciation paraphernalia, etc.

SUMMARY

In one embodiment, a method for selecting a mode/color on a lighting module, the lighting module having only a single button includes: receiving a first actuation of the single button at the lighting module. The method further includes responsive to the first actuation, turning the device on and displaying a first mode/color. The method further includes detecting that the single button is held down. The method further includes displaying a plurality of modes/colors in a timed sequence, such that each mode/color of the plurality of modes/colors is displayed for a preset period of time. The method further includes detecting that the single button is released. The method further includes displaying a selected mode/color of the plurality of modes/colors that was displayed when the single button was released. In one alternative, the method further includes receiving a second actuation of the single button at the lighting module and responsive to the second actuation, changing the selected mode/color to flashing. In another alternative, the changing the selected mode/color only occurs if a flashing preset period of time has not passed. Alternatively, if the flashing preset period of time has passed, the second actuation causes the lighting module to shut off. In another alternative, one of the plurality of modes/colors is a disco mode. Alternatively, the disco mode is a mode characterized by displaying a series of light colors, each for a short period of time, and repeating such displaying. In another alternative, the changing the selected mode/color to flashing does not occur if the selected mode/color is disco mode. Alternatively, the selected mode/color is remembered when the lighting module is shut down, such that upon turning the device on the selected mode/color is activated. In another alternative, the method further includes receiving a third actuation of the single button; and responsive to the third actuation, deactivating the lighting module. Alternatively, the method further includes receiving a second actuation of the single button; detecting that a disco mode of the plurality of modes/colors is active; and responsive to the second actuation, deactivating the lighting module.

In one embodiment, a lighting module includes a light source; a microprocessor; and a button. The microprocessor is configured to execute stored instructions to receive a first actuation of the single button at the lighting module. The microprocessor is further configured to execute stored instructions to responsive to the first actuation, turn the light source on and displaying a first mode/color. The microprocessor is further configured to execute stored instructions to detect that the single button is held down. The microprocessor is further configured to execute stored instructions to display a plurality of modes/colors in a timed sequence, such that each mode/color of the plurality of modes/colors is displayed for a preset period of time. The microprocessor is further configured to execute stored instructions to detect that the single button is released. The microprocessor is further configured to execute stored instructions to display a selected mode/color of the plurality of modes/colors that was displayed when the single button was released. In one alternative, the microprocessor is further configured to execute stored instructions to receive a second actuation of the single button at the lighting module and responsive to the second actuation, change the selected mode/color to flashing. Alternatively, the changing the selected mode/color only occurs if a flashing preset period of time has not passed. In another alternative, if the flashing preset period of time has passed, the second actuation causes the lighting module to shut off. Alternatively, one of the plurality of modes/colors is a disco mode. In another alternative, the disco mode is a mode characterized by displaying a series of light colors, each for a short period of time, and repeating such displaying. Alternatively, the change of the selected mode/color to flashing does not occur if the selected mode/color is disco mode. In another alternative, the selected mode/color is remembered when the lighting module is shut down, such that upon turning the device on the selected mode/color is activated. Alternatively, the microprocessor is further configured to execute stored instructions to receive a third actuation of the single button and responsive to the third actuation, deactivate the lighting module. In another alternative, the microprocessor is further configured to execute stored instructions to receive a second actuation of the single button, detect that a disco mode of the plurality of modes/colors is active, and responsive to the second actuation, deactivate the lighting module.

DETAILED DESCRIPTION

Certain terminology is used herein for convenience only and is not to be taken as a limitation on the embodiments of the systems and methods for optimized single button control of a lighting module including preset memory and hold control (preset single button algorithm/system). In many embodiments, the method/microprocessor-based control system may be implemented in a lighting module. The lighting module in many embodiments is designed to fit in a wide variety of receivers located in the lighting the device. Embodiments of the lighting device may take on various forms, including the ones shown in the present application. The designs herein, in many configurations, provide for a modular system, where the lighting module may fit in a wide variety of devices (lighting devices). In many embodiments, the preset single button algorithm/system provides for a cyclical selection system of color and a single push actuation of on/flash/off. Additionally, in many embodiments the device remembers the color selection of the device. In many embodiments, such a system provides for efficient single button control that minimizes the selection time and wear on the single button. In many embodiments, it capitalizes on the likelihood that the user will desire to select the same color ordinarily for the lighting device.

Figure 1:
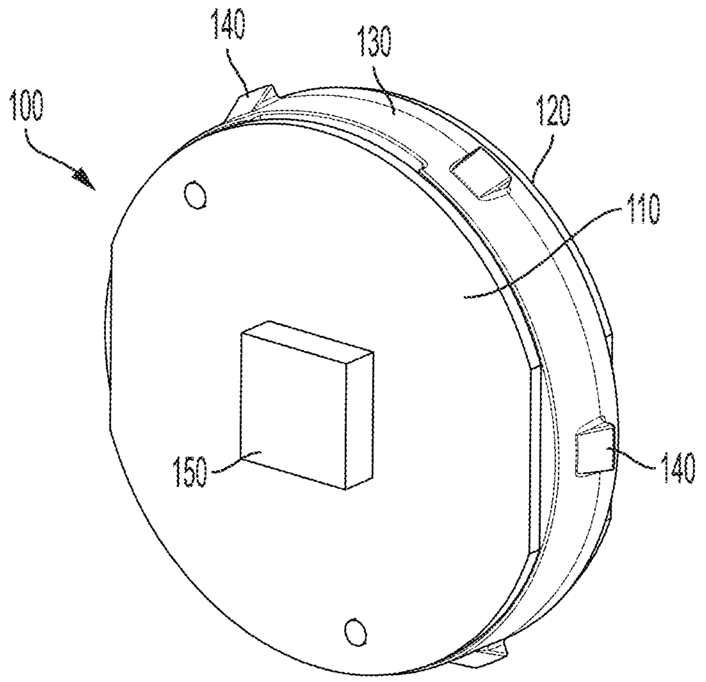
FIG. 1 shows one embodiment of a lighting module.

To add context to the how the single button algorithm operates within a single button lighting device, an exemplary lighting module is provided that may be deployed in a variety of devices, such as balls, light-sticks, glowsticks, flying discs, headbands, bicycle lights, goal markers, fan appreciation paraphernalia, etc. FIG. 1 shows one embodiment of a lighting module 100. Lighting module 100 generally includes 2 printed circuit boards (PCB) that are used for circuitry and to support and enclose the lighting module 100. Lighting module 100 includes PCB 110 and PCB 120. A plastic ring 130 is placed between PCB 110 and PCB 120 to complete the lighting module 100 enclosure. Plastic ring 130 includes protrusions 140 that provide for a fiction or snap fit way of holding the lighting module 100 in a lighting device. This will be described in more detail below. In contrast to many lighting modules, the PCBs form a portion of the module, which saves fabrication costs. Additionally, visible in FIG. 1 is LED 150. This LED in many configurations provides for the vertical projection of light, that is perpendicular to the largest outward facing face. In many embodiments, the PCB 110 may also include exposed microprocessors, capacitors, and or other circuity. This is not shown in the embodiment of the device in FIG. 1.

Figure 2:
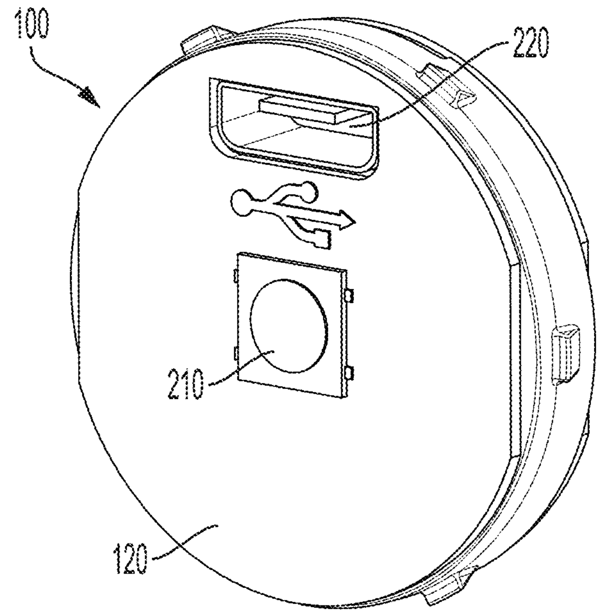
FIG. 2 shows a reverse view of the lighting module of FIG. 1.

FIG. 2 shows another view of the lighting module 100. In this view, push button switch 210 (momentary) is shown. Additionally, charging port 220 is shown. In many embodiments, charging port 220 may be a micro USB port. In alternatives, other charging ports are possible, depending on the total size of the device, including USB ports. As with the view of FIG. 1, PCB 220 may include exposed circuitry or interconnections.

Figure 3:
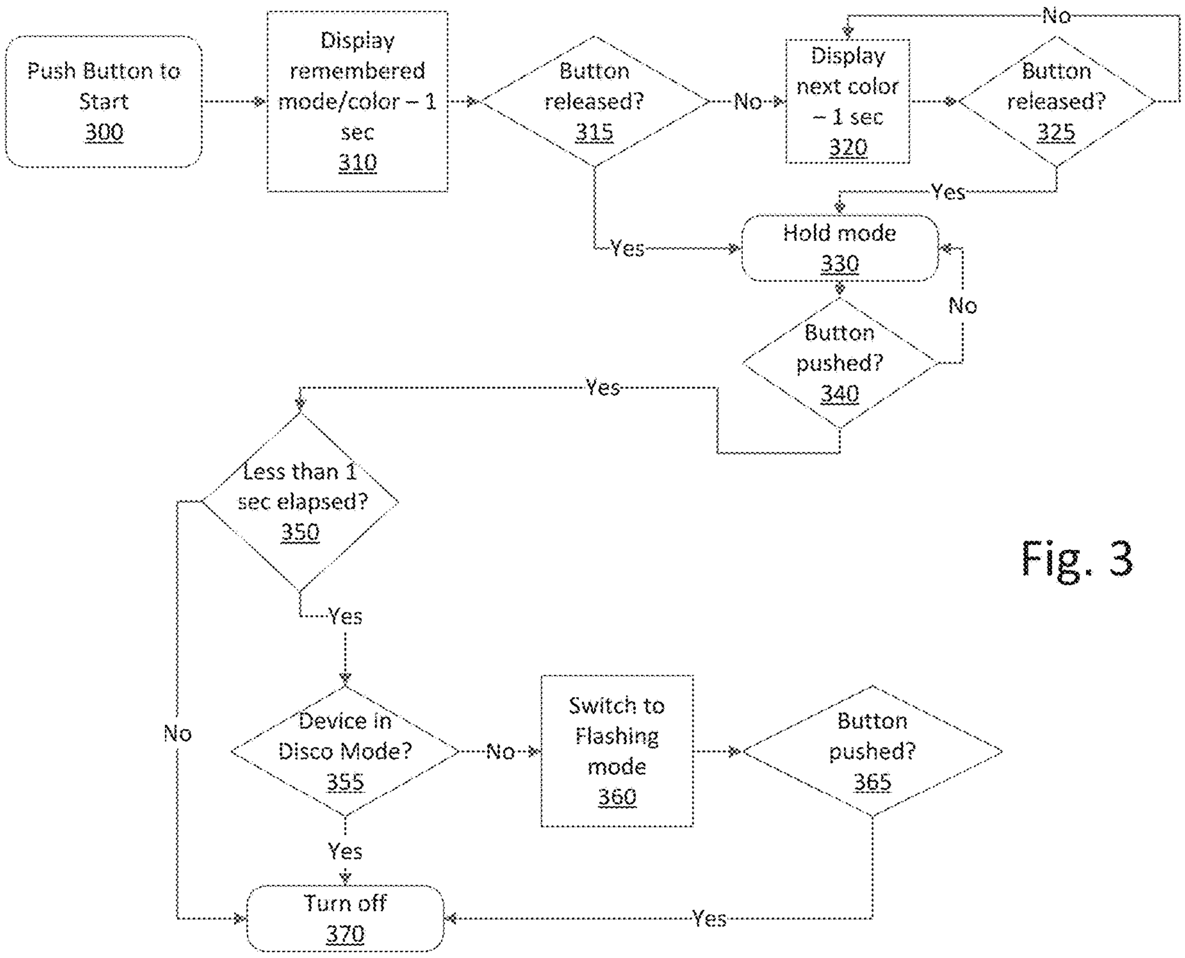
FIG. 3 shows a flowchart for single button operation of the lighting module.

Therefore, an exemplary lighting module is provided that may work with the singe preset single button algorithm/system. FIG. 3 describes one embodiment of a preset single button algorithm/system. In this embodiment, generally, the user holds the button in order to cycle through the available colors and then actuates the button to switch to flashing mode and then actuates again to shut off the device. Additionally, a disco mode may be selected in certain embodiments, which provides for constant color change of the LED. In FIG. 3, one embodiment of the algorithm is shown. In step 300 the user pushes the single button to activate the device. The device has a memory and in step 310 it automatically begins displaying the saved mode. The saved mode is either a continuous light of a single color or what is referred to as a disco mode, where the color is held for 1 sec and then the color switches to the next color for one second and so on. Of course, the one second time is purely exemplary, and other time periods may be set and fall into the scope of the invention. Periods in the range 0.5-5 seconds are believed to be pleasing for the disco mode, however, other periods are possible. If the button is released, then the device advances to step 330 and whatever mode the device is in is held. If the button is instead held, the device begins to cycle through modes in step 320. The device displays the next color/mode in the sequence for one second. In many alternatives, this may be 0.5 seconds. If the button is not released in step 325, then the device displays the next color/mode again in step 320. This continues and is repeated until a release of the button. Of course, the one second time for cycling through the colors/modes is purely exemplary, and other time periods may be set and fall into the scope of the invention. Periods in the range 0.5-5 seconds are believed to be pleasing for the selection of a color/mode, however, other periods are possible. The designation of color/mode is used, because the cycle may only include different colors, or may include colors and intensities, or colors and flashing, or as identified above, disco mode. The color and mode selection may be combined. If the button is released in step 325 then the device proceeds to step 330 and holds whatever color/mode the button is released during. In many embodiments, one of the colors is designated as disco mode and if the button is released during the display of that color then disco mode is selected. Alternatively, a mode can be set of rapid flashing that denotes disco mode, or other visual indicator.

In step 330, when the button has been released and the mode selected, the device monitors for an additional push of the button in step 340. If the button is not pushed, the device remains on and if the button is pushed, the device proceeds to step 350. In step 350 it is determined whether less than one second has elapsed since the initial button press was released. In many embodiments, the one second may be 3 seconds, but of course there are numerous possibilities. If not, the device interprets the push of a button as a request to shut off and the algorithm proceeds to step 370, where it turns off. If the button is pushed within one second, the push is interpreted as a request to transition to flashing mode. In such a case, the flow proceeds to step 355 where it is determined whether the mode the device was in was disco mode. Disco mode does not have a flashing version in some embodiments. If the device is in disco mode, then the flow proceeds to step 370 where it turns off. If it is not, then the device switches to flashing mode in step 360 and waits for the button to be pressed again in step 365 causing the flow to proceed to step 370 where the device turns off. Of course, the one second time is purely exemplary, and other time periods may be set and fall into the scope of the invention. Periods in the range 0.5-5 seconds are believed to be pleasing for the time limit to select flashing mode, however, other periods are possible. Additionally, flashing mode may be possible in some versions of disco mode, so step 355 may be omitted. In such a scenario, the colors may flash, but change more slowly, such that a color is held for 5 seconds while flashing before transitioning to the next color.

Ultimately, the point of the algorithm is to have a system for the selection of a first mode/color and then provide for a modification to the display of the first mode/color all using a single button. In other words, in a first part of the selection the button is held and then released when the desired color/mode is displayed. The desired color/mode may then be modified by pressing the button again within a short period of time (resulting in flashing in the example).

In some embodiments, if after selecting a mode, the button is held down, the flow will proceed from step 330 to step 310, essentially restarting the color/mode selection procedure. In other words, in this configuration, any time the button is held, the system will proceed to the mode selection mode until the button is released. This can occur even when the device is in flashing mode 360. Alternatives to the modes and algorithm are possible, especially in the case of timing. In many embodiments, the system provides for a button hold mode, that may be activated at any time by holding down the button and releasing when the desired mode is displayed. Additionally, the system provides for a time limited mode modification by actuating (and releasing) the button within a period of time of selection of the mode via the button hold.

Additionally, in many embodiments, after the device is shut off, when it is started again, the first mode displayed will be the last mode that was active (unmodified by the flashing selection). By way of example, if in a first action, the button is held to select the color green and then the button actuated quickly to activate flashing mode and then shut off, the default will be the green color. So, when the device is activated, it will activate in a non-flashing green mode. In some alternatives, the device could be programed to activate in flashing mode in this scenario.

Embodiments of the method deployed in the lighting module may occur primarily in the microprocessor. The microprocessor may include software in various embodiments. Various embodiments of the systems and methods controlling the lighting module may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form, such as, but not limited, to, source code, compiled code, interpreted code, executable code, static code, dynamic code, and the like. Such a computer-readable medium may include any tangible non-transitory medium for storing information in a form readable by one or more computers, such as, but not limited to, read only memory (ROM), random access memory (RAM), magnetic disk storage media; optical storage media; a flash memory, etc.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A method for selecting a mode/color on a lighting module, the lighting module having only a single button, the method comprising:

receiving a first actuation of the single button at the lighting module;

responsive to the first actuation, turning the device on and displaying a first mode/color;

detecting that the single button is held down by a user;

displaying a plurality of modes/colors in a timed sequence, such that each mode/color of the plurality of modes/colors is displayed for a preset period of time;

detecting that the single button is released;

displaying a selected mode/color of the plurality of modes/colors that was displayed when the single button was released wherein the selected mode/color is remembered based on the detecting that the single button is released when the lighting module is shut down, such that upon turning the device on the selected mode/color is activated.

2. The method of claim 1, further comprising:

receiving a second actuation of the single button at the lighting module;

responsive to the second actuation, changing the selected mode/color to flashing.

3. The method of claim 2, wherein the changing the selected mode/color only occurs if a flashing preset period of time has not passed.

4. The method of claim 3, wherein if the flashing preset period of time has passed, the second actuation causes the lighting module to shut off.

5. The method of claim 2, wherein one of the plurality of modes/colors is a disco mode.

6. The method of claim 5, wherein the disco mode is a mode characterized by displaying a series of light colors, each for a short period of time, and repeating such displaying.

7. The method of claim 6, wherein the changing the selected mode/color to flashing does not occur if the selected mode/color is disco mode.

8. The method of claim 2, further comprising: receiving a third actuation of the single button;

responsive to the third actuation, deactivating the lighting module.

9. The method of claim 1, wherein the selected mode/color is remembered when the lighting module is shut down, such that upon turning the device on the selected mode/color is activated.

10. The method of claim 1, further comprising: receiving a second actuation of the single button;

detecting that a disco mode of the plurality of modes/colors is active;

responsive to the second actuation, deactivating the lighting module.

11. A lighting module comprising:

a light source;

a microprocessor;

a button;

the microprocessor configured to execute stored instructions to;

receive a first actuation of the single button at the lighting module;

responsive to the first actuation, turn the light source on and display a first mode/color;

detect that the single button is held down by a user;

display a plurality of modes/colors in a timed sequence, such that each mode/color of the plurality of modes/colors is displayed for a preset period of time;

detect that the single button is released;

display a selected mode/color of the plurality of modes/colors that was displayed when the single button was released;

wherein the selected mode/color dependent on when the single button is released is remembered when the lighting module is shut down, such that upon turning the device on the selected mode/color is activated.

12. The lighting module of claim 11, wherein the microprocessor is further configured to execute stored instructions to receive a second actuation of the single button at the lighting module;

responsive to the second actuation, change the selected mode/color to flashing.

13. The lighting module of claim 12, wherein the changing the selected mode/color only occurs if a flashing preset period of time has not passed.

14. The lighting module of claim 13, wherein if the flashing preset period of time has passed, the second actuation causes the lighting module to shut off.

15. The lighting module of claim 12, wherein one of the plurality of modes/colors is a disco mode.

16. The lighting module of claim 15, wherein the disco mode is a mode characterized by displaying a series of light colors, each for a short period of time, and repeating such displaying.

17. The lighting module of claim 16, wherein the change of the selected mode/color to flashing does not occur if the selected mode/color is disco mode.

18. The lighting module of claim 12, wherein the microprocessor is further configured to execute stored instructions to receive a third actuation of the single button;

responsive to the third actuation, deactivate the lighting module.

19. The lighting module of claim 11, wherein the microprocessor is further configured to execute stored instructions to receive a second actuation of the single button;

detect that a disco mode of the plurality of modes/colors is active;

responsive to the second actuation, deactivate the lighting module.

* * * * *